United States Patent [19]
Sobiski et al.

[11] Patent Number: 6,104,703
[45] Date of Patent: Aug. 15, 2000

[54] COMMUNICATION SYSTEMS AND METHODS EMPLOYING RECEIVERS WITH ESTIMATORS

[75] Inventors: Donald J. Sobiski, Spencer; James S. Thorp, Ithaca, both of N.Y.

[73] Assignee: Cornell Research Foundation, Inc., Ithaca, N.Y.

[21] Appl. No.: 08/770,115

[22] Filed: Dec. 20, 1996

[51] Int. Cl.[7] .................................................. H04L 9/12
[52] U.S. Cl. ........................................ 370/252; 375/232
[58] Field of Search ............................ 370/252; 375/232, 375/233, 246, 285

[56] References Cited

U.S. PATENT DOCUMENTS

| | | | |
|---|---|---|---|
| 3,573,624 | 4/1971 | Hartman et al. | 325/42 |
| 5,245,660 | 9/1993 | Pecora et al. . | |
| 5,291,555 | 3/1994 | Cuomo et al. | 380/6 |
| 5,321,409 | 6/1994 | Walker . | |
| 5,379,346 | 1/1995 | Pecora et al. . | |
| 5,398,034 | 3/1995 | Spilker, Jr. | 342/357 |
| 5,402,234 | 3/1995 | Pecora et al. . | |
| 5,402,520 | 3/1995 | Schnitta . | |
| 5,404,298 | 4/1995 | Wang et al. . | |
| 5,432,697 | 7/1995 | Hayes . | |
| 5,442,510 | 8/1995 | Schwartz et al.. . | |
| 5,473,694 | 12/1995 | Carroll et al. . | |
| 5,506,795 | 4/1996 | Yamakawa . | |
| 5,615,208 | 3/1997 | Hagmanns | 370/252 |
| 5,680,462 | 10/1997 | Miller et al. | 380/48 |
| 5,857,165 | 1/1999 | Corron et al. | 455/143 |

OTHER PUBLICATIONS

Liaw et al., "Controlling chaos via state feedback cancellation under a noisy environment", Physics Letter A 211 (1996), Mar. 1996, pp. 350–356.

Abarbanel, Henry D.I. et al., "Secure Communications and Unstable Periodic Orbits of Strange Attractors", IEEE Transactions on Circuits and Systems–II: Analog and Digital Signal Processing, vol. 40, No. 10, Oct. 1993, pp. 643–645.

Aidala, Vincent J., "Kalman Filter Behavior in Bearings–Only Tracking Applications", IEEE Transactions on Aerospace and Electronic Systems, vol. AES–15, No. 1, Jan. 1979, pp.29–39.

Carroll, Thomas L. et al., "Synchronizing Nonautonomous Chaotic Circuits", IEEE Transactions on Circuits and Systems–II: Analog and Digital Signal Processing, vol. 40, No. 10, Oct. 1993, pp. 646–650.

Carroll, Thomas L. et al., "Synchronizing Chaotic Circuits", IEEE Transactions on Circuits and Systems, vol. 38, No. 4, Apr. 1991, pp. 453–456.

Cuomo, Kevin M., "Synchronization of Lorenz–Based Chaotic Circuits with Applications to Communications", IEEE Transactions on Circuits and Systems–II: Analog and Digital Signal Processing, vol. 40, No. 10, Oct. 1993, pp. 626–633.

(List continued on next page.)

*Primary Examiner*—Chi H. Pham
*Assistant Examiner*—Frank Duong
*Attorney, Agent, or Firm*—Jones, Tullar & Cooper PC

[57] ABSTRACT

Communications systems and methods employ receivers which utilize estimators, such as extended Kalman filters, to estimate a transmitted information signal based only upon initial parameters in a transmitter and a single transmitted state of the transmitter. This arrangement facilitates the use of inherently secure chaotic modulation schemes in the transmitter. In one embodiment, one or more parameters of nonlinear transmitter elements are modulated with one or more information signals to generate a chaotically varying transmission signal. A communication scheme known as Parameter Division Multiple Access (PDMA) is thus created in which multiple information signals from multiple transmitters can be combined and transmitted to corresponding multiple receivers in a single transmission signal. A special Kalman filter known as a feedback Kalman filter is employed for separating each receiver's corresponding portion of the transmitted signal.

15 Claims, 8 Drawing Sheets

OTHER PUBLICATIONS

Drake, Daniel F. et al., "Tracking Multiple Chaotic Systems from a Single Observed Sequence", IEEE, 1994, pp. 75–78.

Endo, Tetsuro et al., "Synchronization of Chaos in Phase–Locked Loops", IEEE Transactions on Circuits and Systems, vol. 38, No. 12, Dec. 1991, pp. 1580–1588.

Fowler, Thomas Benton, Jr., "STochastic Control of Chaotic Nonlinear Systems", UMI Dissertation Services, Feb. 1986, pp. 1–285.

Fowler, Thomas B., "Application of Stochastic Control Techniques to Chaotic Nonlinear Systems", IEEE Transactions on Automatic Control, vol. 34, No. 2, Feb. 1989, pp. 201–205.

Frey, Douglas R., "Chaotic Digital Encoding: An Approach to Secure Communication", IEEE Transactions on Circuits and Systems–II: Analog and Digital Signal Processing, vol. 40, No. 10, Oct. 1993, pp. 660–666.

Hayes, Scott, "Communicating with Chaos", Physical Review Letters, vol. 70, No. 20, May 1993, pp. 3031–3034.

Hayes, Scott et al., "Experimental Control of Chaos for Communication", Physical Review Letters, vol. 73, No. 13, Sep. 1994, pp. 1781–1784.

Kalman, R.E., "A New Approach to Linear Filtering and Prediction Problems", Journal of Basic Engineering, Transactions of the ASME, Mar. 1960, pp. 35–45.

Ott, Edward et al., "Controlling Chaos", Physical Review Letters, vol. 64, No. 11, Mar. 1990, pp. 1196–1199.

Pecora, Louis M. et al., "Synchronization in Chaotic Systems", Physical Review Letters, vol. 64, No. 8, Feb. 1990, pp. 821–824.

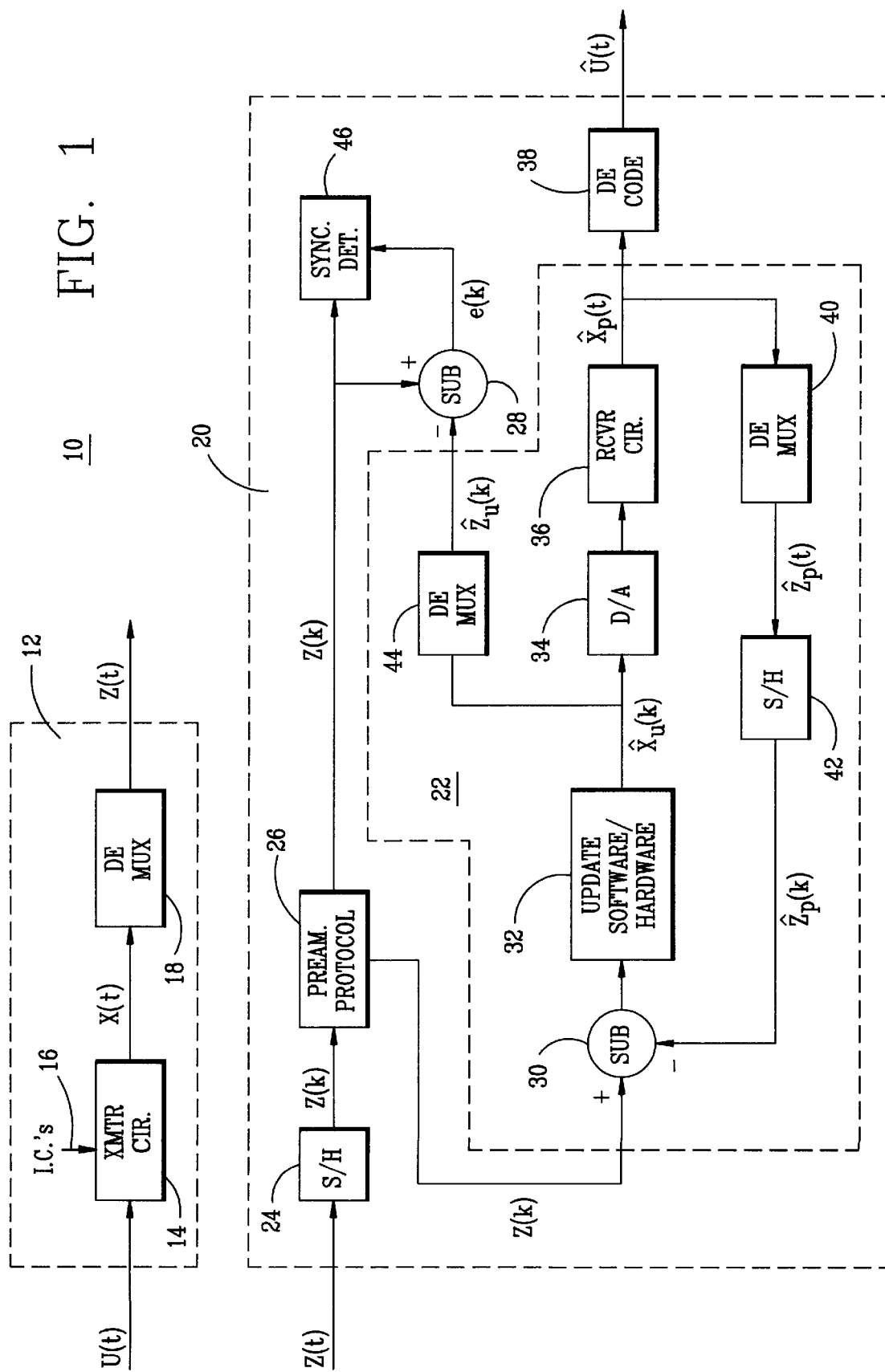

COMMUNICATION SYSTEMS AND METHODS EMPLOYING RECEIVERS WITH ESTIMATORS

BACKGROUND OF THE INVENTION

The present invention relates in general to communication systems and methods, particularly those employing chaotically varying transmission signals, which incorporate receivers using estimators, such as extended Kalman filters, for estimating the states and parameters in corresponding transmitters to facilitate synchronization therewith and reception of signals therefrom.

Being able to synchronize two or more remote systems has applications in communications, control and similar fields. Once synchronized, such systems lend themselves to various communications techniques. Current methods are based on linearity, or regular nonlinear behavior, or require that stability restrictions be imposed upon subsystems.

Nonlinear systems can possess more than a single equilibrium point; this property can give rise to more complex dynamics than is generally observed in linear systems, which possess only a single equilibrium point. Nonlinear systems can exhibit stable, unstable, cyclic or chaotic behavior, and it is entirely possible that a single nonlinear system can exhibit all four types of behavior depending upon the choice of operational parameters and/or initial conditions. It is also possible that almost every nonlinear system has some range of parameters and/or set of initial conditions for which it will exhibit chaotic behavior.

Chaotic behavior can be characterized by a sensitivity to initial conditions, that is, two trajectories starting from arbitrarily close, but different, initial conditions will always diverge from each other as time passes, and eventually become completely uncorrelated, although they both continue to exhibit the same characteristics of behavior. Chaotic systems are deterministic systems that exhibit random appearing behavior.

Synchronization of two chaotic systems has been disclosed, for example, in U.S. Pat. Nos. 5,245,660 and 5,379,346 to Pecora, et al., and in U.S. Pat. No. 5,473,694 to Carrol, et al., however, their methods are restricted to only those systems that can be decomposed into stable subsystems.

In U.S. Pat. No. 5,291,555, Cuomo, et al., two methods of transmission are disclosed: the first method is to add a signal to the chaotic transmitter output, which is then transmitted as a sum of the two wave forms. The signal is recovered at the receiver by subtracting the synchronized chaotic carrier from the received wave form. The second method is to vary a parameter in the transmitter, causing the receiver to lose synchronization lock temporarily, and then regaining lock when the parameter is toggled back, creating a binary bit stream of lock-unlock which is decoded by measuring the energy in the error signal.

The method of adding a message to the chaotic carrier is very sensitive with respect to the signal to carrier to noise power ratios, making it difficult to send a message with low enough power to avoid detection, yet strong enough to be heard above noise. The second method of locking-unlocking for bit transmission is also very sensitive with respect to additive noise, since the noise appears directly in the error signal.

In 1960, Richard E. Kalman published a paper entitled "A New Approach to Linear Filtering and Prediction Problems" (Journal of Basic Engineering 82D, pp. 35–45, 1960) in which he disclosed a linear filtering technique that can be employed for estimating the states of a system based upon initial state conditions and measurements of the system over time. Devices constructed in accordance with this technique became known as Kalman filters. Subsequently, this concept was applied to estimation of a system's parameters in addition to its states, and the device for accomplishing this became known as the extended Kalman filter (EKF).

EKFs have been used in a computer simulation to estimate the states of a chaotic system. However, to the inventors' knowledge, EKFs have never been used in communication systems for estimating the states and parameters of a transmitter and thereby facilitating synchronization of a receiver with the transmitter.

SUMMARY OF THE INVENTION

The present invention provides communication systems and methods which are based upon the use of one or more EKFs in a system receiver to facilitate estimation of the states and parameters in a transmitter, thereby permitting synchronization with, and reception of signals from, the transmitter. This arrangement is particularly suited for use with chaotic system based communication schemes in which only the initial parameters of the transmitter are known to the receiver. The EKF provides the means by which the values of the chaotically varying states and/or parameters of the transmitter may be estimated based upon its initial parameters and measurements of the signals received by the receiver. In effect, the EKF acts as the "tuning" device in the receiver system which enables synchronization with the transmitting system. This arrangement provides inherent security for the transmitted information signal since even though it does not employ any type of encoding scheme that could be deciphered, the signal cannot be detected without actual knowledge of the transmitter's initial parameters.

With the EKF as the tuning device in the receiver system, a nonconventional communication scheme can be employed. More particularly, instead of using a conventional frequency or amplitude modulation scheme, parameter modulation can be employed in which the electrical parameters of the transmitter are modulated with the information signal to be transmitted. For example, a sequence of digital pulses can be transmitted by varying an electrical resistance in the transmitter between two values, one for a binary 1, and a second for binary 0. This parameter modulation technique can be extended to a scheme for simultaneous transmission of multiple signals known as Parameter Division Multiple Access (PDMA) in which two or more parameters in the transmitter are simultaneously modulated by two or more corresponding information signals, the resulting signal is sent over a single channel, and then all of the levels of the modulated parameters are decoded in the receiver to reconstruct the multiple information signals.

The PDMA concept can also be used for simultaneous transmission of multiple signals from multiple transmitters to multiple receivers over a single communication channel using the EKF configuration. In this instance, each receiver includes an EKF which is "tuned" to a corresponding transmitter for estimation of that transmitter's signal. Since this signal is combined with the signals from other transmitters, the estimations generated by all of the other EKFs must be subtracted from the transmitted signal before it is fed as input to the corresponding receiver's EKF. All of the EKFs are connected in this feedback manner and are thus collectively referred to as a Feedback Kalman Filter (FKF).

BRIEF DESCRIPTION OF THE DRAWINGS

The features and advantages of the present invention will become apparent from the following detailed description of a number of preferred embodiments thereof, taken in conjunction with the accompanying drawings, in which:

FIG. 1 is a schematic block diagram of a communication system constructed in accordance with a first preferred embodiment of the present invention in which a receiver is provided which employs an Extended Kalman Filter (EKF) for synchronization with a transmitter;

DETAILED DESCRIPTION OF THE PREFERRED EMBODIMENTS

Figure 2A:
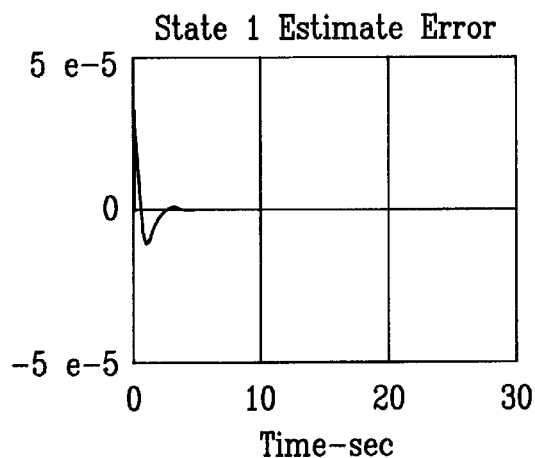
FIGS. 2A–2D are graphs showing the synchronization process employed by the EKF to estimate the error of three transmitter states, and thereby estimate the identity of the transmitted signal.
Figure 2B:
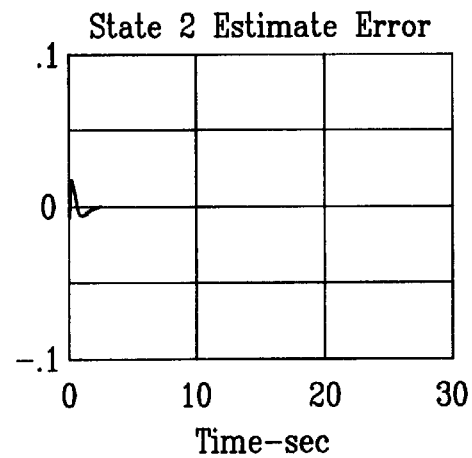
Figure 2C:
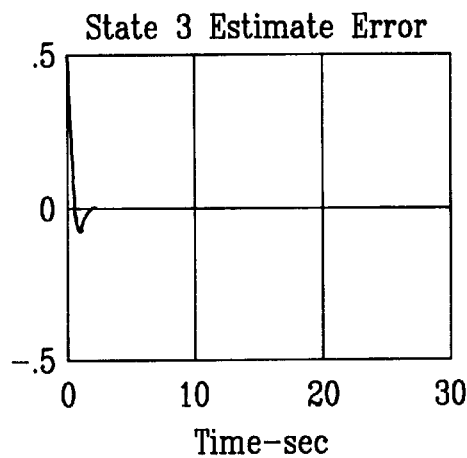
Figure 2D:
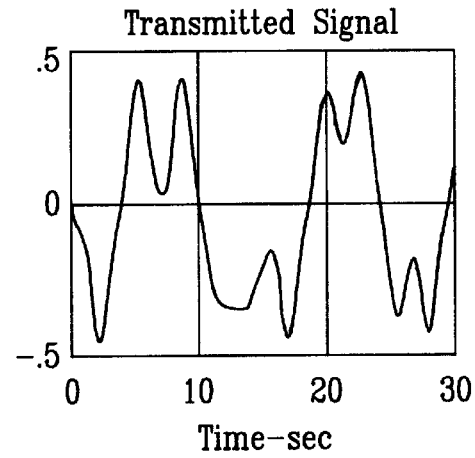

Referencing the drawings, FIG. 1 illustrates a communication system 10 which incorporates the basic concepts of the present invention and comprises a first preferred embodiment thereof. The system 10 includes a transmitter 12 which receives an information signal U(t) to be transmitted, and modulates the signal in accordance with a suitable modulation scheme. Although any modulation scheme can be employed by the transmitter 12, the system 10 is particularly well suited for use with chaotic modulation schemes in which the information signal is used to modulate parameters within the transmitter 12. A particular advantage of such a scheme is that it is inherently secure because the scheme cannot be detected without actual knowledge of the initial parameters of the transmitter 12. An example of a chaotic modulation scheme is discussed below in conjunction with FIG. 3 in which one or more nonlinear parameters in the transmitter 12, such as resistances, inductances or capacitances, are modulated by the input signal information.

The transmitter 12 includes a suitable transmitter circuit 14 which is comprised of a plurality of circuit elements necessary to implement the chaotic or other modulation scheme. These elements may include electrical resistors, capacitors, inductors, diodes and numerous digital circuit elements, many of which are preferably nonlinear to achieve the desired chaotic behavior. The details of such circuits are well known in the art, and it should be understood that the present invention is not limited to use with any particular transmitter circuit.

A plurality of initial conditions 16 is fed into the transmitter circuit 14 at transmitter start up which can be used to initialize the transmitter's energy related states (voltages and currents) and electrical parameters (resistances, capacitances and inductances). The initial electrical parameters are particularly important when the transmitter circuit 14 is based on a chaotic system because they are necessary for use by a corresponding receiver to generate an estimation of the transmitter's signal, thereby facilitating synchronization therewith.

Once it is operating, the transmitter circuit 14 modulates the information signal U(t) and generates a multiple state transmitter signal X(t). To maintain compatibility with conventional communication systems, and to insure security of the transmitted signal, it is desired that only a single state of the transmitter 12 be transmitted. For this reason, a first demultiplexer 18 or other suitable selecting circuit is employed to select a single state, Z(t), to be transmitted.

Z(t) is transmitted to a receiver 20 which comprises a number of circuit elements, the most notable of which is an estimator, preferably an EKF 22, to be described in greater detail below. Although other types of estimators may be employed, such as a maximum likelihood estimator or a least squares estimator, for example, the use of the EKF 22 is preferred because of its robustness, well defined divergence characteristics and well behaved local properties which make the EKF 22 particularly well suited for use in estimating chaotic nonlinear systems. In the receiver 20, Z(t) is first fed into a first conventional sample and hold (S/H) circuit 24 which periodically samples Z(t), thereby generating Z(k), and holds this value for a predetermined amount of time. Z(k) is then fed through a preamble protocol switching circuit 26 which controls application of Z(k) to the EKF 22 and a subtractor 28. The purpose of the preamble protocol switching circuit 26 is discussed in greater detail later.

The EKF 22 includes a subtractor 30 which receives Z(k) on a "+" input. The subtractor 30 is employed to generate a first error signal $e_p(k)$ which is employed by an update software program or hardware circuit 32 to generate an estimate $\hat{X}_u(k)$ of the transmitter signal X(t) through Kalman based estimation techniques employing the known parameter values and a mathematical model of the transmitter 12, as well as the error signal $e_p(k)$ generated as a result of one or more previous estimations.

$\hat{X}_u(k)$ is fed through a D/A converter 34, and the resulting analog signal is employed to adjust electrical parameters in a receiver circuit 36. Receiver circuit 36 is, in essence, a physical model of the transmitter circuit 14, however, employs circuit elements with parameters which are adjustable in response to $\hat{X}_u(k)$, and generates another version of an estimated transmitter signal known as $\hat{X}_p(t)$. $\hat{X}_p(t)$ is finally decoded in a decoder 38 to generate an estimate $\hat{U}(t)$ of the transmitted information signal U(t) as output of the receiver 20.

$\hat{X}_p(t)$ is also fed through another demultiplexer 40 for generating $\hat{Z}_p(t)$, which is then directed to a second S/H circuit 42 for generating $\hat{Z}_p(k)$. $\hat{Z}_p(k)$ is fed to the "−" input of the subtractor 30 so that it may be subtracted from Z(k), thereby generating $e_p(k)$ for input to the update software/hardware 32.

To insure proper synchronization between the transmitter 12 and the receiver 20, $\hat{X}_u(k)$ is also fed from the update software/hardware 32 through a third demultiplexer 44 which generates $\hat{Z}_u(k)$, and applies this parameter to the "−" input of the subtractor 28 to subtract $\hat{Z}_u(k)$ from Z(k), thereby generating e(k). The error value e(k) is periodically sampled by, and stored in, a synchronization detector circuit 46 which compares a currently received e(k) with a previously received e(k) to determine if the error value is being maintained within predetermined limits over time, thereby confirming proper synchronization of the receiver 20 to the transmitter 12. If the error value is not maintained within predetermined limits, the synchronization detector circuit 46 can be designed to generate an indication that synchronization has been lost. This can be used, for example, to reset the EKF 22 so that the receiver 20 can attempt to resynchronize with the transmitter 12.

To demonstrate how the receiver 20 synchronizes with the transmitter 12 through use of the EKF 22, consider the following differential equation that represents an electrical circuit as well as having electro-mechanical analogue:

$$\ddot{x}(t) = \alpha x(t) - \beta x^3(t) + \delta \dot{x}(t) + \gamma \cos(\omega t) \quad (1)$$

This equation is known as the Duffing equation to those skilled in the art; the state x and its time derivatives represent voltages and currents as functions of time, the parameters $\alpha, \beta$ and $\delta$ represent values of circuit elements, $\gamma$ is the gain and $\omega$ is the frequency of the driving oscillator. This can be re-written in "almost linear" state space form as:

$$f(X(t)) = \begin{bmatrix} \dot{x}_1(t) \\ \dot{x}_2(t) \\ \dot{x}_3(t) \\ \dot{x}_4(t) \end{bmatrix} = \begin{bmatrix} 0 & 1 & 0 & 0 \\ \alpha - \beta x_1^2(t) & \delta & \gamma & 0 \\ 0 & 0 & 0 & \omega \\ 0 & 0 & -\omega & 0 \end{bmatrix} \begin{bmatrix} x_1(t) \\ x_2(t) \\ x_3(t) \\ x_4(t) \end{bmatrix} \quad (2)$$

This system is chosen as being representative of a large class of dynamical systems and has both rich dynamical behavior and enough parameters to make the results non-trivial. This system is used in both the transmitter and receiver for this teaching.

Let the continuous—discrete nonlinear system be defined as:

$$\dot{X}(t) = f(X(t),t) + g(X_1(t), \omega_1(t), t)$$

$$Z(k) = h(X(k),k) + v(k) \quad (3)$$

with $$X \in \Re^n, Z \in \Re^p$$

and where the input is the process noise sequences $\omega$, with mean $E\{w(k)\} = 0$, and covariance matrices $$E\{\omega(j)\omega^T(k)\} = Q_i(k)\delta_{jk}; E\{v(j)v^T(k)\} = R_i(k)\delta_{jk}$$

where $\delta_{ij}$ is the kronecker delta function.

The state space form of the Duffing system permits easy application of the extended Kalman filter with equation (2) as the model for both the transmitter 12 and the receiver 20. Let the subscript P denote a value propagated to the current time step, and let the subscript U denote that value after it has been updated with the current measurement. Let $\hat{X}_*(k)$ represent the estimate of the true values of the states of the transmitter X(k) at the time k, where $*$ is understood to mean P or U, and let $P_*(k) = E\{[X(k) - \hat{X}_*(k)][X(k) - \hat{X}_*(k)]^T\}$ be the error covariance matrix associated with the error in the estimate. The calculations that take place within the EKF 22 begin with the propagation of the last updated estimate $\hat{X}_P(k-1)$ from the time k−1 up to the time k at which the current measurement is received; this can be represented by the following integral:

$$\hat{X}_P(k) = \int_{k-1}^{k} f(\hat{X}_U(\kappa T)) d\kappa \quad (4)$$

This process actually takes place within the receiver circuit 36 and the values of the states are available to the update software/hardware 32 that comprises the heart of the EKF 22. The following linearization takes place each time step within the EKF 22:

$$A(\hat{X}) \triangleq \nabla_{X_U(k-1)} f(\hat{X}_U(k-1)) \quad (5)$$

where $$\nabla_x \triangleq \frac{d}{dX}$$

is the gradient operator. This result is used to form a transition matrix for the current time increment:

$$\Phi(k, k-1) \triangleq \exp\left(\left[A(\hat{X})_{\hat{X} = \hat{X}_U(k-1)}\right] \Delta T\right) \quad (6)$$

which permits the propagation of the error covariance matrix via the well known Kalman filter equations from the time k−1 to the current time k:

$$P_P(k) = \Phi(k, k-1) P_U(k-1) \Phi^T(k, k-1) + Q(k-1) \quad (7)$$

As the new measurement is received, the Kalman gain is computed:

$$K(k) = P_P(k) C(k) [C(k) P_P(k) C^T(k) + R(k)]^{-1} \quad (8)$$

which is used to incorporate the new information into the estimate, as well as update the error covariance matrix:

$$\hat{X}_U(k) = \hat{X}_P(k) + K(k)[z(k) - C(k)\hat{X}_P(k)] \quad (9)$$

$$P_U(k)=[I_n-K(k)C(k)]P_P(k) \quad (10)$$

As discussed previously, only a single signal, state one, from the Duffing system is transmitted, and the rest of the internal states must be estimated within the receiver. The observation matrix is:

$$C(k)=[1\ 0\ 0\ 0]\forall k \quad (11)$$

and as a consequence, the residual $Z(k)-C\hat{X}_p(k)$ is a scalar.

As the EKF 22 runs, its estimate of the current values of the states and/or parameters is used to update the actual values within the receiver circuit 36. Circuitry to perform these kinds of corrections abounds in the prior art, and does not, in and of itself, constitute a significant part of the present invention. For example, variable resistors, capacitors and inductors are well known, and the error signal generated by the update software/hardware 32 can be employed to actuate electromechanical, or similar, devices, for adjusting the parameters of these circuit elements.

To synchronize the transmitter circuit 14 with the receiver circuit 36, the input, U(t), is set to zero, and the transmitter circuit 14 is initialized to some nonzero state and allowed to run. A typical set of initial conditions is given by $X(O)=[0.10\ 0.22-0.48\ 0.0]^T$, As the transmitter 12 runs, the output Z(t)=CX(t) is sampled and transmitted at the rate of 50 Hz. The appropriate state estimate that is calculated within the receiver 20 corresponding to the measurement is $\hat{X}_u(k)$, and the output from the receiver 20 is $\hat{Z}_u(k)=C\hat{X}_u(k)$. The synchronization error between the receiver 20 and transmitter 12 is $e(k)=Z(k)-\hat{Z}_u(k)$. Synchronization is declared to have occurred by observing the magnitude of the error signal:

$$e(k)=_\Delta|Z(k)-\hat{Z}_U(k)|<\epsilon;0<\epsilon\ll 1 \quad (12)$$

This is a necessary condition, but it is not sufficient. It is not sufficient because synchronization of this state with its corresponding state in the receiver 20 does not imply that the other states have synchronized between transmitter 12 and receiver 20. Perfect synchronization never occurs because of finite word length effects and hardware mismatches, so the sampling period must be chosen short enough to minimize divergence between the transmitter and receiver between updates by each new measurement.

This also suggests a better test for synchronization; since chaotic systems gain information with time, the synchronization error should be recomputed after several measurements have been deliberately skipped. This strategy would tend to magnify errors due to the mismatch at a rate related to the difference between the largest Lyapunov exponents of the two systems, that is:

$$e(k+j)\approx e(k)exp(|\lambda_{xmtr}-\lambda_{rcur}|j\Delta T) \quad (13)$$

This test is therefore incorporated into the synchronization preamble protocol switching circuit 26 which periodically disconnects the Z(k) input to the subtractor 30 in the EKF 22 so that multiple samples of e(k) can be compared by the synchronization detector circuit 46 for synchronization confirmation. Since the output of the chaotic transmitter 12 is subject to finite word length effects and hardware mismatches, the measurement is inherently noisy, and a non-zero noise covariance power for R must be chosen. Similarly, due to the propagation of the receiver model via numerical integration and finite word length, the process was not perfectly represented, and a non-zero process noise power must be chosen for Q.

FIGS. 2A–2D show the successful synchronization of three of the states in the receiver 20. State four is not shown because it synchronizes symmetrically with state three. Note that the plots for states two and three (FIGS. 2B and 2C, respectively) are an artifact permitted by the simulation; since only state one is transmitted, the receiver 20 never-has knowledge of the true values of the remaining states. The estimation technique employed by the EKF 22 is predicated upon the EKF manipulating the energy in the system using the energy in the residual to cause the distribution of energy in the receiver 20 to match that in the transmitter 12.

As stated previously, the communication system 10 of FIG. 1 can be employed with any modulation scheme, however, it is particularly suited for use with schemes based upon chaotic systems, since the EKF 22 can produce an accurate estimation of a chaotically varying transmission signal. Thus, conventional modulation schemes such as amplitude modulation and frequency modulation may be replaced by another form of modulation known as parameter modulation. In parameter modulation, the information signal U(t) is employed to modulate one or more electrical parameters, including resistances, capacitances and inductances, within the transmitter circuit 14. If the transmitter circuit 14 is chaotic, then the modulation of these parameters over a suitable range will produce a chaotically varying transmission signal.

The EKF approach adapts very well to estimating the value of that parameter that has been switched within the transmitter 12; the value of this parameter becomes the information carrier—i.e., if the parameter is resistance, then a value of nKΩ can be decoded as a binary "one" and a value of mKΩ can be decoded as a binary "zero" within the receiver 20. The information is thus encoded implicitly within the chaotic carrier wave form as the shape and location of the chaotic attractor is varied within the transmitter 12.

Implementation of this strategy within the receiver 20 is straightforward by simply augmenting the "almost linear" set of equations with a state that represents the parameter that will be modulated in the transmitter 12. The model for the Duffing system would become:

$$f(X(t)) = \begin{bmatrix} \dot{x}_1(t) \\ \dot{x}_2(t) \\ \dot{x}_3(t) \\ \dot{x}_4(t) \\ \dot{x}_5(t) \end{bmatrix} = \begin{bmatrix} 0 & 1 & 0 & 0 & 0 \\ x_5(t)-\beta x_1^2(t) & \delta & \gamma & 0 & 0 \\ 0 & 0 & 0 & \omega & 0 \\ 0 & 0 & -\omega & 0 & 0 \\ 0 & 0 & 0 & 0 & 0 \end{bmatrix} \begin{bmatrix} x_1(t) \\ x_2(t) \\ x_3(t) \\ x_4(t) \\ x_5(t) \end{bmatrix} \quad (14)$$

where $X_5(t)=_\Delta\alpha$ has become the information carrier and the parameter to be estimated. Since no dynamics are associated with the switching in this model, it is assumed piece-wise constant. The dynamics are statistically transferred to the process noise matrix as power associated with this term. Because the switching occurs almost instantly, this represents the classic division of modeling the low frequency part of the response (DC here) and ignoring the higher frequency components. The EKF 22 automatically accounts for this change in the system model, and the augmented version of equation (5) will become:

$$A(\hat{X}) = \begin{bmatrix} 0 & 1 & 0 & 0 & 0 \\ \hat{x}_5(k-1) - 3\beta\hat{x}_1^2(k-1) & \delta & \gamma & 0 & \hat{x}_1(k-1) \\ 0 & 0 & 0 & \omega & 0 \\ 0 & 0 & -\omega & 0 & 0 \\ 0 & 0 & 0 & 0 & 0 \end{bmatrix} \quad (15)$$

When the parameter is switched, it can be decoded within the receiver 20 and interpreted as a zero or a one. Because the range of parameter variation can be very large compared to signal to noise ratios, this technique is robust in the presence of additive white Gaussian noise.

Figure 3A:
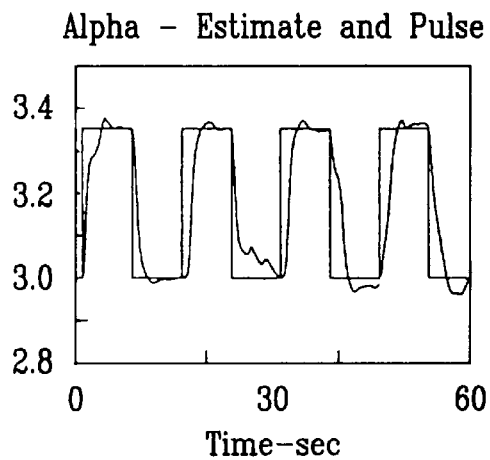
FIGS. 3A–3D are graphs illustrating a transmitted pulse resulting from modulation of a transmitter parameter, alpha, an estimate of the transmitted pulse using the receiver of FIG. 1, and the estimated error between the two, on a noise free channel in FIGS. 3A and 3B, and on a channel where noise is injected 20 dB down from the signal in FIGS. 3C and 3D.
Figure 3B:
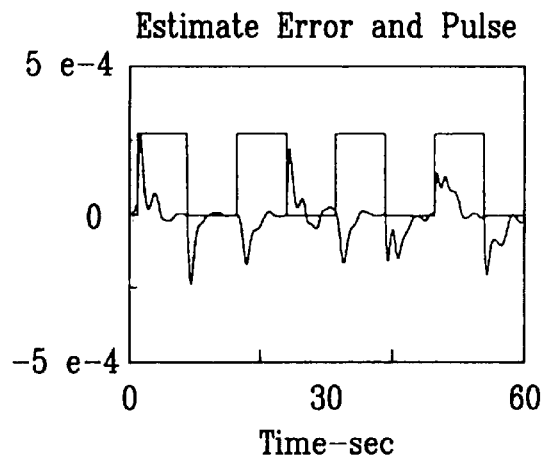
Figure 3C:
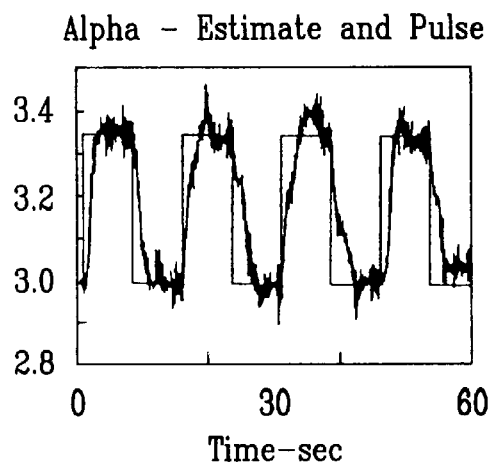
Figure 3D:
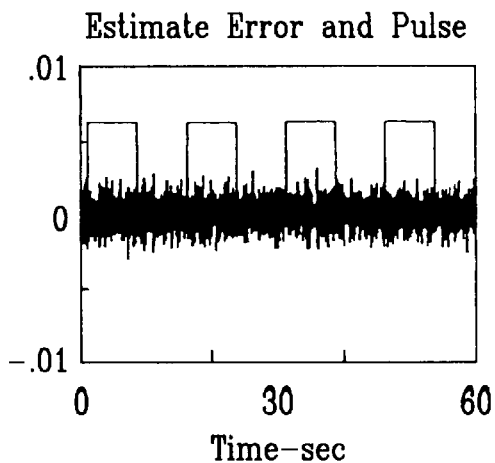

FIGS. 3A–3D shows binary transmission by varying the parameter $\alpha$ between {3.0,3.35} on a noise free channel in FIGS. 3A and 3B, and also on a channel where noise was injected 20 dB down from the signal in FIGS. 3C and 3D.

The plots of synchronization error have the true values of the parameter switching superimposed upon them. In the noise free case, the error transients at parameter switching remain well within the error levels observed in FIGS. 2A–2D. In the noisy transmission, these errors are not even detectable in the noisy signal. Note that several orders of magnitude separate the error signal amplitude from the parameter modulation, providing for a robust communication technique.

Figure 4A:
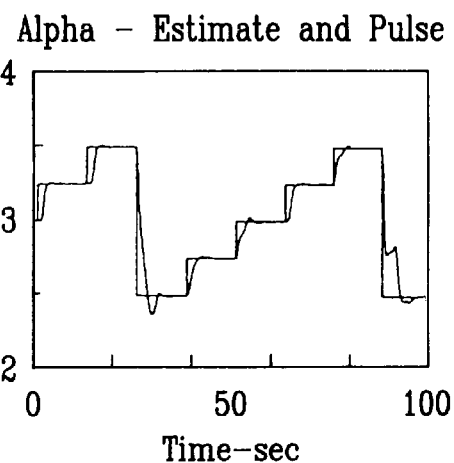
FIG. 4A is a graph illustrating switching of a transmitter parameter, alpha, among five different values for modulation of a transmitter signal to facilitate M-ary communication, and also shows the estimate of alpha generated by the receiver circuit of FIG. 1.
Figure 4B:
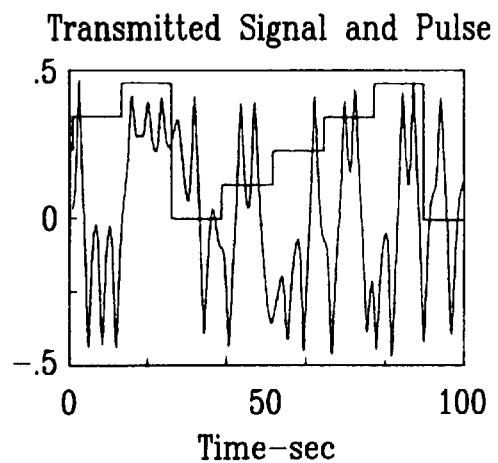
FIG. 4B shows the transmitted signal generated by the transmitter in response to modulation by alpha of FIG. 4A.
Figure 4C:
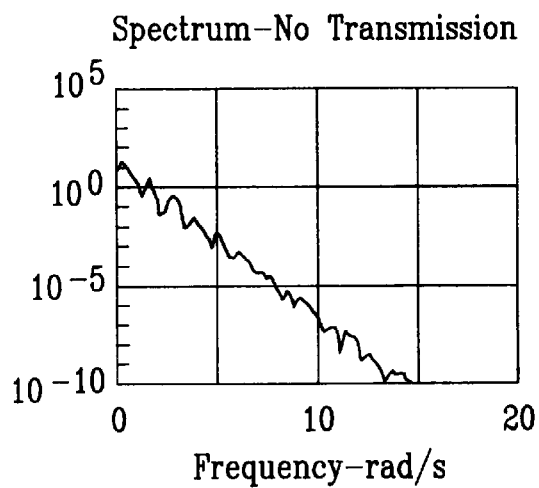
FIGS. 4C and 4D are graphs illustrating the frequency spectrums for no transmission and transmission, respectively, using the parameter modulation communication technique.
Figure 4D:
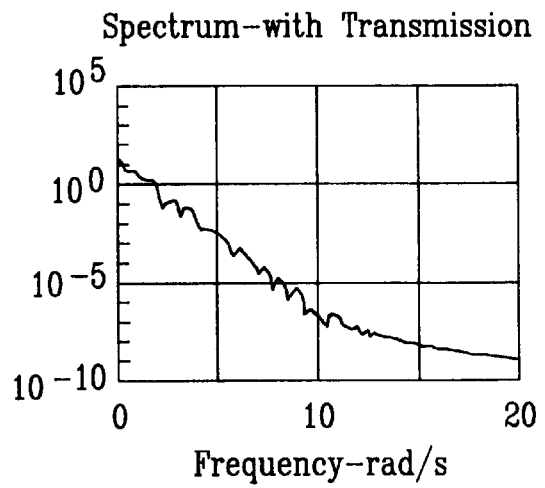
Figure 5A:
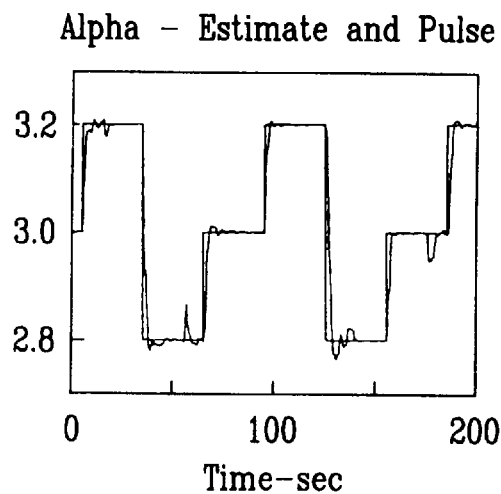
FIG. 5A is a graph of a first varying parameter, alpha, employed in a parameter division multiple access (PDMA) communication scheme in accordance with another preferred embodiment of the present invention, and also shows the resulting estimate of alpha generated by an EKF-based receiver.
Figure 5B:
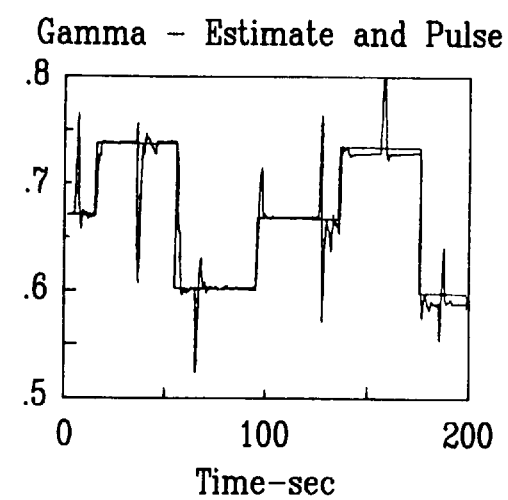
FIG. 5B is a graph illustrating a second varying parameter, gamma, which is to be combined with alpha illustrated in FIG. 5A, and also shows the resulting estimate of gamma generated by the EKF-based receiver.
Figure 5C:
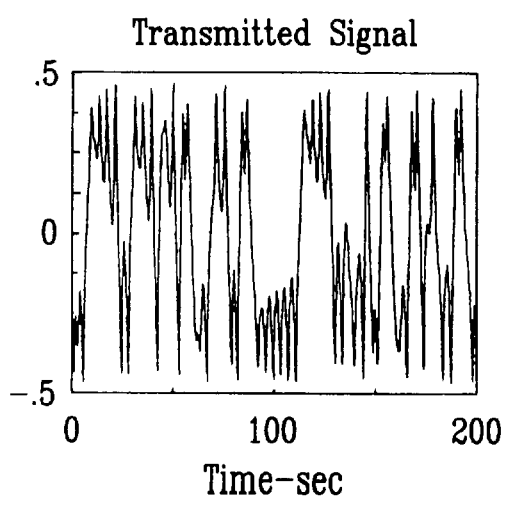
FIG. 5C is a graph of the resulting transmitted signal modulated with alpha and gamma of FIGS. 5A and 5B.
Figure 5D:
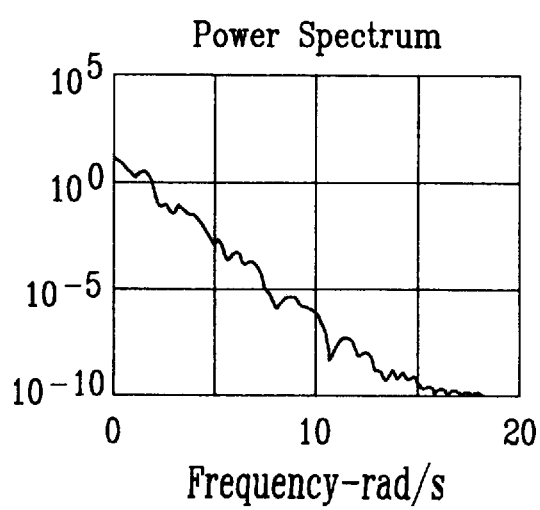
FIG. 5D is a graph illustrating the power spectrum of the PDMA embodiment of the present invention.

This communication strategy can be readily extended, since many levels of parameter variation are potentially available, M-ary communication is achieved on the channel almost trivially. FIGS. 4A and 4B illustrate the parameter $\alpha$ being switched among the values {2.5,2.75,3.0,3.25,3.5}. Of particular interest is a comparison of the power spectra of the unswitched and switched systems illustrated in FIGS. 4C and 4D, respectively. It is not apparent that any communication is taking place, showing that even large excursions of one of the parameters results in very little movement of the attractor and its dynamics.

It is possible to further augment the system model and estimate all of the parameters simultaneously. Estimating all of the parameters resolves the parameter mismatch problem, and permits communication via parameter estimation to proceed even in the presence of significant hardware mismatches. It has a much more profound implication, however. It is now possible to switch more than a single parameter in the transmitter 12 and decode it in the receiver 20. Switching two parameters immediately doubles bandwidth with no extra hardware required. FIGS. 5A–5D illustrate the asynchronous switching of two parameters, $\alpha$ and $\gamma$, through M-ary levels concurrently.

This represents a new type of simultaneous multiple access of a single channel, in contrast to standard techniques of TDMA (Time Division Multiple Access), FDMA (Frequency Division Multiple Access), or CDMA (Code Division Multiple Access). Since this method relies upon the switched parameter as the information carrier, it is referred to as Parameter Division Multiple Access (PDMA). The first unique feature is that this has minimal hardware requirements, since only a single transmitter and a single receiver are required. This could be important in satellite based communications, where space and weight is a premium. This also would permit easy redundancy in critical applications.

A second feature is increased bandwidth in a manner akin to that achieved by CDMA, but it does not suffer from the limitation of code sequence correlation distance. The parameters exhibit no particular correlation with each other, but clearly there are physical limits to the number of parameters available, as well as to the permissible range through which they may be switched. A third characteristic is security. Not only is the chaotic signal extremely difficult to intercept, but this interception requires accurate estimation of all parameters, thereby requiring detailed knowledge of the transmitter. Additionally, the chaotic nature of the signal provides for inherent security from unauthorized access, although this technique is not limited to only chaotic systems but is applicable to communications systems in general.

The technique of PDMA can be extended to multiple transmitter/receiver pairs through the use of a special Kalman filter structure known as feedback Kalman filter (FKF). The FKF structure was motivated by a need to extract information unique to each filter from a single shared measurement generated by multiple transmitters. The purpose of the single shared measurement formed from the individual measurements is to increase bandwidth and provide for increased security.

Figure 6:
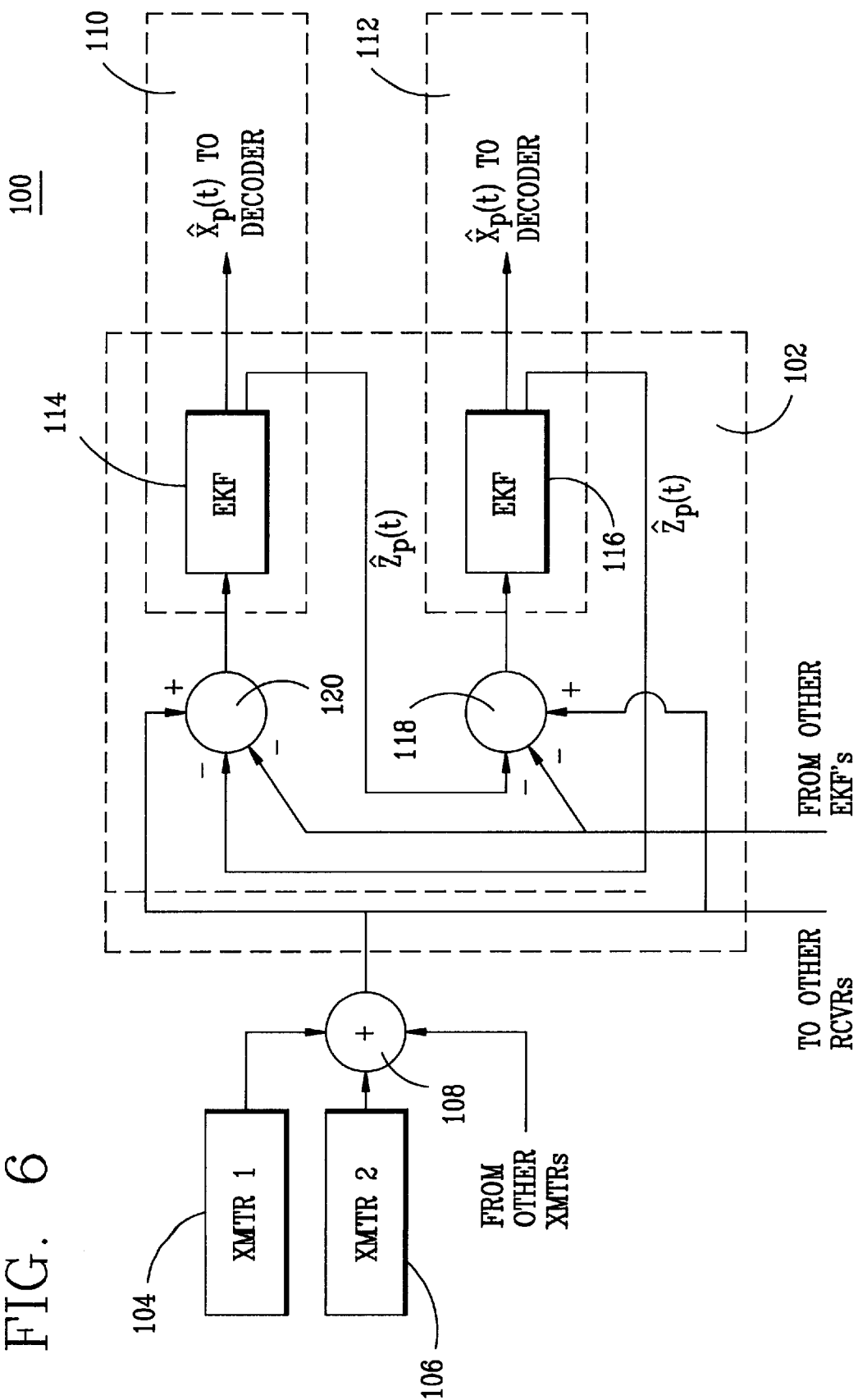
FIG. 6 is a schematic block diagram of a multiple transmitter and receiver communication system constructed in accordance with another preferred embodiment of the present invention which employs multiple Kalman filters connected in a feedback arrangement, the combination of filters being known as a feedback Kalman filter (FKF)

FIG. 6 is a general block diagram which illustrates a multiple access, single channel communication system 100 which incorporates a feedback Kalman filter 102. Modulated signals from a first transmitter 104 and a second transmitter 106 (each configured like the transmitter 12 of FIG. 1) are combined in an adder 108, and the combined modulated transmitter signal is transmitted to first and second receivers 110 and 112 (each configured like the receiver 20 of FIG. 1) through the EKF 102.

The FKF 102 includes a first EKF 114 for generating an estimate of the information signal generated by the first transmitter 104, and a second EKF 116 for generating an estimate of the information signal sent by the second transmitter 106. The estimate $\hat{Z}_p(t)$ of the transmitted state generated by the first EKF 114 is fed back to the "−" input of a subtractor 118 whose output is connected to an input of the second EKF 116. Similarly, the estimate $\hat{Z}_p(t)$ of the transmitted state generated by the second EKF 116 is fed back to a "−" input of a second subtractor 120 whose output is connected to the input of the first EKF 114. The incoming combined modulated transmitter signal is fed to both "+" inputs of the first and second subtractors 118 and 120. In this manner, the inputs to each of the EKFs 114 and 116 comprise the transmitted signal minus the estimates generated by any other EKF in the system, so that the resulting input signal to each EKF closely corresponds with only the portion of the transmitted signal which is designated for that EKF.

Although FIG. 6 illustrates an FKF embodiment employing two transmitters, two receivers and two EKFS, the feedback Kalman filter is not limited any particular number of transmitters and receivers. The augmented form of the feedback equations reveals a block diagonal structure that permits extension to arbitrarily many pairs, theoretically, although physical constraints of limited interconnection topography and guard band availability would limit the number in practice. The block diagonal form also permits transmitter-receiver pairs to be switched in and out of the feedback network without affecting the stability of the network. Thus, to extend the FKF concept to three or more transmitter and receiver pairs, the input to each receiver's EKF must be the transmitted signal minus the estimates generated by each of the other receiver's EKFs. Accordingly, FIG. 6 indicates that additional transmitters, receivers and EKFs may be employed as desired.

In order to develop the equations for the feedback Kalman filter, two different continuous—discrete nonlinear systems are defined as:

$\dot{X}_1(t) f_1(X_1(t),t) + g1(X_1(t),\omega_1(t),t)$ $Z_1(k) = h_1(X_1(k),k) + \upsilon_1(k)$ (16)

$\dot{X}_2(t) = f_2(X_2(t),t) + g_2(X_2(t), \omega_2(t),t)$ $Z_2(k) = h_2(X_2(k),k) + \upsilon_2(k)$ (17)

with $X_1 \in \Re^{n_1}, Z_1 \in \Re^{p_1}$ and $X_2 \in \Re^{n_2}, Z_2 \in \Re^{p_2}$ and where the inputs are the process noise sequences $\omega_1$ and $\omega_2$, with means $E\{w_i(k)\} = E\{\upsilon_i(k)\} = 0; \ i = 1, 2$ and with covariance matrices $E\{\omega_i(j)\omega_i^T(k)\} = Q_i(k)\delta_{jk}; E\{\upsilon_i(j)\upsilon_i^T(k)\} = R_i(k)\delta_{jk}; \ i=1,2$ with $\delta_{ij}$ the kronecker delta function.

Let the updated estimate of each system at time k be $\hat{X}_{u1}(k)$ and $\hat{X}_{u2}(k)$ respectively. Let these estimates be from an extended Kalman filter, with each filter also identified with the subscript 1 or 2. In the feedback Kalman filter, each filter has the other filter's estimate subtracted from its input, which is the common measurement $Z(k) = \Delta Z_1(k) + Z_2(k)$ The equations for the update step of each estimate become $\hat{X}_{U_1}(k) = \hat{X}_{P_1}(k) + K_1(k)[Z(k) - C_1(k)\hat{X}_{P_1}(k)] - K_1(k)C_2(k)\hat{X}_{P_2}(k)$ (18)

$\hat{X}_{U_2}(k) = \hat{X}_{P_2}(k) + K_2(k)[Z(k) - C_2(k)\hat{X}_{P_2}(k)] - K_2(k)C_1(k)\hat{X}_{P_1}(k)$ Where $\hat{X}_{P_i}(k) \triangleq \Phi_i(k,k-1)\hat{X}_{U_i}(k-1)$; i=1,2 is the estimate that has been propagated from time k−1 to time k.

From these equations, the update equation for the estimate can be written in augmented form as:

$$\begin{bmatrix} \hat{X}_{U_1}(k) \\ \hat{X}_{U_2}(k) \end{bmatrix} = \begin{bmatrix} \hat{X}_{P_1}(k) \\ \hat{X}_{P_2}(k) \end{bmatrix} + \begin{bmatrix} K_1(k) \\ K_2(k) \end{bmatrix} \left[ Z(k) - [C_1(k) \ C_2(k)] \begin{bmatrix} \hat{X}_{P_1}(k) \\ \hat{X}_{P_2}(k) \end{bmatrix} \right]$$ (19)

Similarly, the update equation for the error covariance matrices will become:

$$\begin{bmatrix} P_{U_1}(k) & 0 \\ 0 & P_{U_2}(k) \end{bmatrix} = \left[ \begin{bmatrix} I_n & 0 \\ 0 & I_m \end{bmatrix} - \begin{bmatrix} K_1(k) \\ K_2(k) \end{bmatrix} [C_1(k) \ C_2(k)] \right] \begin{bmatrix} P_{P_1}(k) & 0 \\ 0 & P_{P_2}(k) \end{bmatrix}$$ (20)

If new "big" matrices are defined from the augmented matrices above, the Kalman gain and the update equation for the error covariance matrix will be:

$K(k) = P_p(k)C^T(k)[C(k)P_p(k)C^T(k) + R(k)]^{-1}$ $P_U(k) = [I_{n+m} - K(k)C(k)]P_p(k)$ (21)

and the update equation for the estimate can be rewritten as:

$\hat{X}_U(k) = \hat{X}_p(k) + K(k)[Z(k) - C(k)X_p(k)]$ (22)

The equations for the propagation of the individual estimates and the error covariance matrix are defined in a similar manner. With partitioned matrices defined as:

$$\Phi(k, k-1) = \begin{bmatrix} \Phi_1(k, k-1) & 0 \\ 0 & \Phi_2(k, k-1) \end{bmatrix}$$ (23)

$$\Gamma(k, k-1) = \begin{bmatrix} \Gamma_1(k, k-1) & 0 \\ 0 & \Gamma_2(k, k-1) \end{bmatrix}$$

$$Q(k-1) = \begin{bmatrix} Q_1(k-1) & 0 \\ 0 & Q_2(k-1) \end{bmatrix}$$

the propagation of the error covariance matrix becomes:

$P_p(k) = \Phi(k,k-1)P_U(k-1)\Phi^T(k,k-1) + \Gamma(k,k-1)Q(k-1)\Gamma^T(k,k-1)$ (24)

The estimate is propagated by the hardware, as before.

The feedback Kalman filter is seen to be a Kalman filter with independent subsystems and inherits all the properties of ordinary Kalman filters. It is the single scalar measurement and the special structure of the observation matrix that gives the FKF the properties of simultaneous multiple access of a single channel.

The FKF-based communication system 100 depicted in FIG. 6 represents a new method of communication developed by summing the outputs from two or more chaotic, or other, transmitters and then transmitting that sum as a scalar measurement on a single channel, providing for simultaneous multiple access of that channel. One immediate consequence is the increase of bandwidth, while another is security of transmission.

It is clear from FIG. 6 and from equation (18) that if both receivers 110 and 112 are synchronized in the feedback Kalman filter network, then each receiver will only processes the input signal from its paired transmitter. Locking occurs in both receivers because each individual filter takes energy from the residual and begins to follow its internal model; as the individual estimates converge, each filter is presented with a measurement that has increasingly more of the estimate of the other signal subtracted from it.

For the purposes of communication, the Duffing system and the Rössler system were used for the transmitter-receiver pairs. They were chosen because both are chaotic, and the systems are of different orders and have different responses. The Duffing system is given in "almost linear" form by equation (2), while the Rössler system can be formulated in a similar manner as:

$$f_R(X(t)) = \begin{bmatrix} \dot{x}_1(t) \\ \dot{x}_2(t) \\ \dot{x}_3(t) \end{bmatrix} = \begin{bmatrix} 0 & -1 & -1 \\ 1 & \phi & 0 \\ 0 & 0 & x_1(t) - \psi \end{bmatrix} \begin{bmatrix} x_1(t) \\ x_2(t) \\ x_3(t) \end{bmatrix} + \begin{bmatrix} 0 \\ 0 \\ \theta \end{bmatrix}$$ (25)

Synchronization of a chaotic system via the extended Kalman filter has already been demonstrated. Several notes about the possible divergence of the EKF are important, however.

The length of propagation time is a critical parameter: if the time between measurements is shorter than the time it takes for the estimate to diverge significantly, the EKF will track the transmitter, given a reasonable model and appropriate tuning. It is not possible to establish precise bounds for this time period, since it is dependent on system dynamics, word length, measurement and process noise, and any modeling errors that may exist in the receiver, as well as being related to the largest Lyapunov exponent of the chaotic system.

Another consideration is the suboptimal nature of the Kalman gain in the EKF formulation. Since the covariance matrix is being propagated through a linear system, it is not exact, and as a consequence, the Kalman gain and resulting update are not exact, either. This can cause filter divergence through several mechanisms.

Divergence of the EKF, where the linearized system can lose observability, causes the covariance matrix to collapse. This causes the Kalman gain to become zero for the unobservable states, and the filter stops updating those states and diverges from truth. A second type of divergence can occur if the covariance matrix becomes ill-conditioned and the state corresponding to the smallest covariance element gets updated with a very large, but incorrect, measurement. The update is accepted because of the small covariance associated with it, but it causes the other states in the filter to "walk off". A third type of divergence is caused by the suboptimal nature of the Kalman gain; if the nonlinear system undergoes some rapid and unmodeled change, the filter never quite catches up to the underlying nonlinear system, and gradually diverges from the true values of the states.

The divergence of the filter can be anticipated, however, and the observability matrix for both systems can be calculated and shown to full rank, thereby eliminating loss of observability as a source of divergence. Other systems can be analyzed in this manner.

The second and third types of divergence can be eliminated through a strategy called residual monitoring, which checks the acceptability of the update in terms of the appropriate error covariance matrix elements. If $p_{ii}$ is the element at the ii diagonal position of the error covariance matrix, the following criterion must be net before the update is allowed to take place:

$$\left| [Z(k) - C(k)\hat{X}_P(k)]_i \right| \leq n\sqrt{p_{ii}} \quad (26)$$

This requires the $i^{th}$ element of the residual to lie within n standard deviations of the mean. If the test is passed, the update is accepted; if the test is failed, the update is rejected and the propagation step repeated. Since the covariance matrix will always get larger during propagation when process noise is included (which is the case here), eventually the covariance matrix will get large enough to accept a measurement and the filter will begin tracking again.

To illustrate simultaneous channel access with multiple transmitters, two chaotic systems were simulated, and the state $X_1(t)$ from each system sampled at 50 Hz, summed with its counterpart from the other system and then transmitted. This was presented as a scalar measurement to the feedback Kalman filter network. The damping ratio $\delta$ is varied in the Duffing system between the values $\{0.233, 0.433, 0.633\}$, while the gain $\psi$ is varied in the Rössler system between the values $\{3.75, 4.00, 4.25\}$.

Figure 7A:
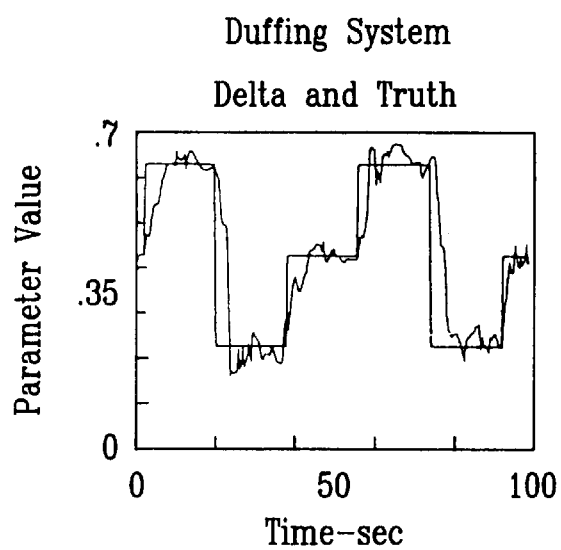
FIGS. 7A and 7B are graphs illustrating sample pulse trains generated by first and second chaotic systems, a Duffing system and a Rössler system, including the estimates of the pulse trains generated by an EKF-based receiver.
Figure 7B:
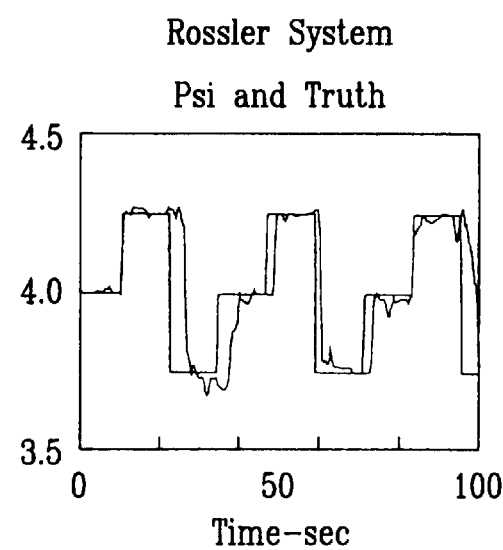
Figure 7C:
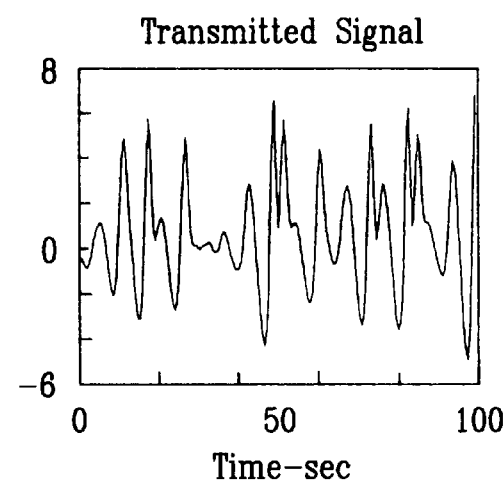
FIG. 7C is a graph illustrating the transmitted signal wave form generated by a transmitter in response to the combined signals of FIGS. 7A and 7B.

The results are depicted in FIGS. 7A–7C which show M-ary communication in both systems as demonstrated in PDMA communications, representing a significant increase in bandwidth within each system and over the entire channel. This result is surprisingly robust, since the signal for the Rössler system is approximately an order of magnitude larger that the Duffing signal. FIGS. 7A and 7B show the true values of the parameters generated by the transmitter plotted along with their estimates.

The technique of the feedback Kalman filter is not restricted to just a single pair of transmitters and receivers; it can be extended to include arbitrarily many pairs, and furthermore, any couplet of transmitter and receiver can be switched in and out of the network without compromising the remaining estimates or the stability of the network. Consider a more general form of equation (19):

$$\begin{bmatrix} \hat{X}_{U_1}(k) \\ \hat{X}_{U_2}(k) \\ \vdots \\ \hat{X}_{U_n}(k) \end{bmatrix} = \begin{bmatrix} \hat{X}_{P_1}(k) \\ \hat{X}_{P_2}(k) \\ \vdots \\ \hat{X}_{P_n}(k) \end{bmatrix} + \begin{bmatrix} K_1(k) \\ K_2(k) \\ \vdots \\ K_n(k) \end{bmatrix} [Z(k) - \quad (27)$$

$$[C_1(k) \quad C_2(k) \quad \cdots \quad C_n(k)] \begin{bmatrix} \hat{X}_{P_1}(k) \\ \hat{X}_{P_2}(k) \\ \vdots \\ \hat{X}_{P_n}(k) \end{bmatrix}$$

This extension can be made to the equation for the Kalman gain and update of the error covariance matrix, as well as to the equations for the propagation of the error covariance. Because of the nature of the partitions, equation (22), and all the other "big" matrix equations will retain the same form, and all the properties will still be valid.

As discussed previously, arbitrarily many Kalman filters can be connected in feedback. Physically realizing this system has the problem of an interconnection network which grows arithmetically; each filter adds n+1 connections and wires. This is a common problem, and has been addressed successfully in the design of VLSI circuitry.

This structure was implemented in a network with three different Duffing systems. Three Duffing systems were used to ensure the individual measurements would all be "close" to each other in chaos space, with respect to magnitude and frequency, and to examine robustness of communication under this type of a test.

Each Duffing system had a different parameter varied, to effectively create three distinct systems. System one had the parameter α varied over the range $\{1.4, 1.5, 1.6\}$, system two had the parameter δ varied over $\{0.7, 0.8, 0.9\}$, and system three had the parameter ω varied over $\{1.05, 1.15, 1.25\}$ rad/sec. Note that this range of parameters provides a guard band against the nominal values of α=3.0, δ=0.433, and ω=√3 to minimize cross talk between the systems.

Figure 8A:
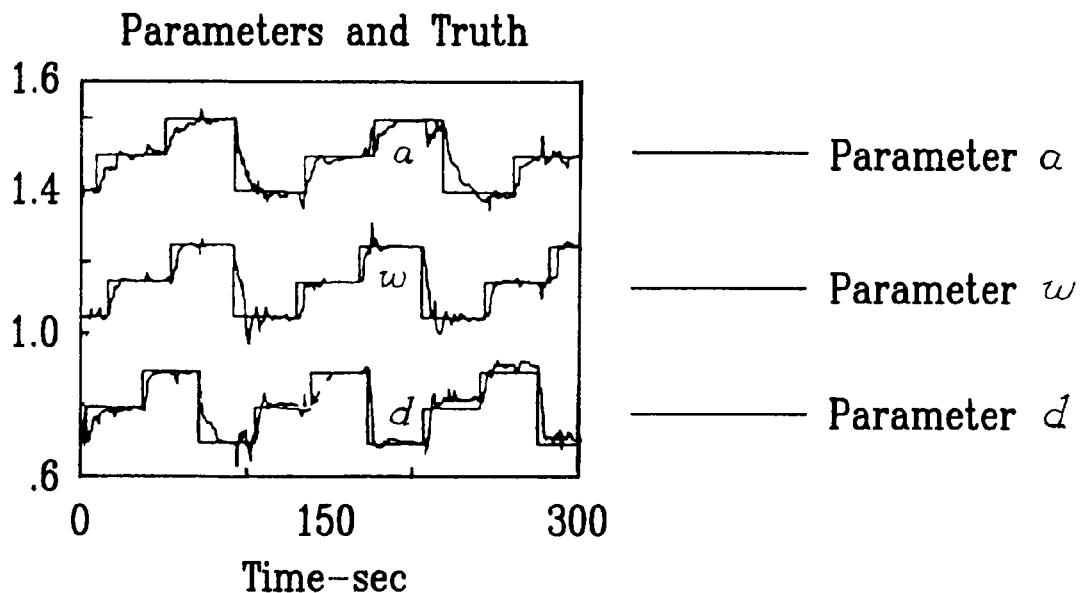
FIG. 8A is a graph illustrating three sample parameters employed in a multiple transmitter, multiple access communication system, including the estimates of those parameters generated by corresponding EKF-based receivers.
Figure 8B:
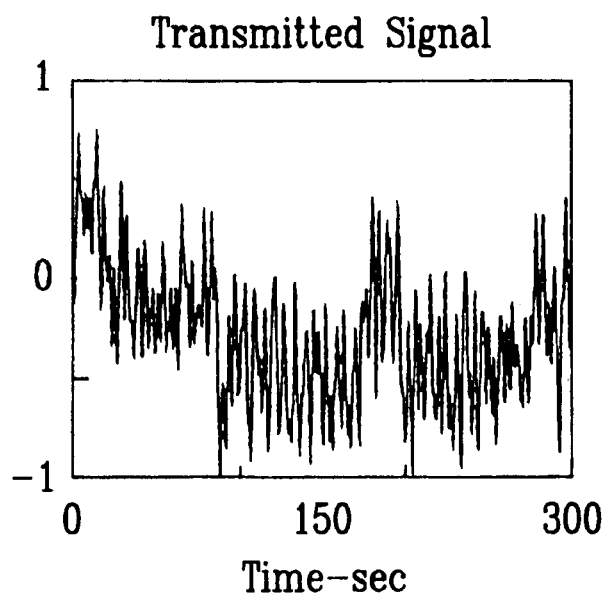
FIG. 8B is a graph illustrating the transmitted signal resulting from modulation of a plurality of transmitters, each with a corresponding one of the parameters of FIG. 8A.

FIGS. 8A and 8B show the results of this simulation, demonstrating the efficacy of this approach. Each of the three parameters that were estimated are shown with their true values in FIG. 8A. Some cross talk is evident, but the ability of the feedback Kalman filter to sort each of the parameter variations out from a single measurement on a single channel is clear.

It is obvious in the plot of the estimates that M-ary communication is occurring in each transmitter simultaneously. The transmitted signal, which is the sum of the signals from each of the three Duffing systems, is shown in FIG. 8B.

In summary, the present invention provides improved communication systems and methods that are particularly suited for employing inherently secure chaotic modulation schemes. The use of an EKF or other estimator in the system receiver or receivers facilitate synchronization with a transmitter whose parameters are modulated with one or more information signals, only a single state of the transmitter is sent to the receiver, and the receiver only has knowledge of the transmitter's initial parameters. The parameter modulation technique can be employed in a PDMA scheme in which multiple information signals from one or more transmitters can be combined in a single transmitted signal, and detected by one or more corresponding receivers. The FKF provides a means by which multiple receivers can separate and detect their corresponding portion of the transmitted signal.

Although the invention has been disclosed in terms of a number of preferred embodiments, and variations thereon, it will be understood that numerous additional modifications and variations could be made thereto without departing from the scope of the invention as defined by the following claims.

What is claimed is:

1. A method for communicating at least one information signal from a transmitter to a receiver comprising the steps of:
   a) providing a transmitter for generating a transmitter signal said transmitter being based on a chaotically varying system;
   b) modulating at least one electrical parameter in said transmitter with an information signal to generate a chaotically varying modulated transmitter signal including a plurality of states;
   c) transmitting only a selected portion of said modulated transmitter signal to a receiver, said selected portion including less than all of said states;
   d) providing said receiver with initial parameter information for said transmitter;
   e) applying said selected portion of said modulated transmitter signal to an Extended Kalman Filter (EKF) in said receiver; and
   f) generating an estimate of said information signal with said EKF using only said selected portion of said modulated transmitter signal and said initial parameter information.

2. The method of claim 1, wherein said step of transmitting only a selected portion of said modulated transmitter signal further comprises transmitting only a single one of said states of said modulated transmitter signal to said receiver.

3. The method of claim 1, wherein said step of modulating further comprises modulating said transmitter signal with a first information signal by modulating a parameter in said transmitter with said first information signal, and simultaneously modulating said transmitter signal with a second information signal by modulating a second parameter in said transmitter with said second information signal to generate a modulated transmitter signal for communicating both of said first and second information signals to said receiver.

4. A method for communicating a plurality of information signals from a plurality of transmitters to a plurality of receivers comprising the steps of:
   a) providing a plurality of transmitters for generating a plurality of corresponding transmitter signals;
   b) modulating each said transmitter signal with a corresponding one of a plurality of information signals to generate a plurality of modulated transmitter signals;
   c) combining said plurality of modulated transmitter signals to form a combined modulated transmitter signal;
   d) transmitting a selected portion of said combined modulated transmitter signal to a means for separating each said modulated transmitter signal from said combined modulated transmitter signal;
   e) separating said selected portion of said combined modulated transmitter signal into a plurality of received signals, each of which corresponds to one of said modulated transmitter signals; and
   f) applying each of said received signals to a corresponding estimator in a corresponding one of said receivers for generating an estimate of each said corresponding information signal therefrom.

5. The method of claim 4, wherein said means for separating comprises a plurality of subtractors, one for each receiver, for subtracting all but a corresponding one of said received signals from said combined modulated transmitter signal.

6. The method of claim 5, wherein each of said received signals is generated as an estimate by a corresponding one of said estimators.

7. The method of claim 5, wherein each of said estimators comprises an extended Kalman filter.

8. A communication system comprising:
   a) a transmitter for transmitting an information signal by modulating a transmitter signal with an information signal, said transmitter being based on a chaotically varying system and including:
      1) means for modulating at least one electrical parameter in said transmitter with an information signal to generate a chaotically varying modulated transmitter signal including a plurality of states; and
      2) means for transmitting only a selected portion of said modulated transmitter signal, said selected portion including less than all of said states; and
   b) a receiver for receiving said selected portion of said modulated transmitter signal, said receiver including an Extended Kalman Filter (EKF) for generating an estimate of said information signal from said selected portion of said modulated transmitter signal and initial parameter information for said transmitter.

9. The system of claim 8, wherein said selected portion comprise only a single one of said states in said modulated transmitter signal.

10. The system of claim 8, wherein said transmitter further includes means for modulating said transmitter signal with a second information signal, whereby said EKF generates an estimate of both of said first and second information signals.

11. A communication system comprising:
    a) a plurality of transmitters for transmitting a corresponding plurality of information signals, each of said transmitters including means for modulating a parameter in each of said transmitters with a corresponding one of said plurality of information signals, thereby generating a plurality of modulated transmitter signals;
    b) means for selecting a portion of each of said modulated transmitter signals to be transmitted;
    c) means for combining said portions of said plurality of modulated transmitter signals to form a combined modulated transmitter signal; and
    d) a plurality of receivers, each for receiving a corresponding one of said information signals, each said receiver including means for generating an estimate of said corresponding information signal from said selected portion of said combined modulated transmitter signal.

12. The system of claim 11, wherein each means for estimating comprises an extended Kalman filter.

13. The system of claim 12, further comprising a plurality of subtractor means, one for each said extended Kalman filter, for subtracting from said combined modulated transmitter signal, estimates generated by each of said other extended Kalman filters, to generate said selected portion of said modulated transmitter signal corresponding to said information signal to be estimated by said extended Kalman filter.

14. The system of claim 11, wherein each parameter to be modulated in each of said transmitters is a parameter of a nonlinear device in a chaotically behaving system within said transmitter, whereby each said modulated transmitter signal is chaotically varying.

15. The system of claim 11, wherein each said modulated transmitter signal includes a plurality of states, and said means for selecting selects only a single one of said states.

* * * * *